(12) United States Patent
Takata et al.

(10) Patent No.: US 12,099,726 B2
(45) Date of Patent: Sep. 24, 2024

(54) REBALANCING VOLUMES IN COMPUTER SYSTEM COMPRISING UPPER AND LOWER CLUSTER

(71) Applicant: Hitachi, Ltd., Tokyo (JP)

(72) Inventors: Masanori Takata, Tokyo (JP); Mitsuo Hayasaka, Tokyo (JP)

(73) Assignee: HITACHI, LTD., Tokyo (JP)

( * ) Notice: Subject to any disclaimer, the term of this patent is extended or adjusted under 35 U.S.C. 154(b) by 147 days.

(21) Appl. No.: 17/902,229

(22) Filed: Sep. 2, 2022

(65) Prior Publication Data
US 2023/0259286 A1 Aug. 17, 2023

(30) Foreign Application Priority Data
Feb. 16, 2022 (JP) .................. 2022-022423

(51) Int. Cl.
*G06F 3/06* (2006.01)
*G06F 16/182* (2019.01)

(52) U.S. Cl.
CPC ............ *G06F 3/0619* (2013.01); *G06F 3/065* (2013.01); *G06F 3/067* (2013.01); *G06F 16/1844* (2019.01)

(58) Field of Classification Search
CPC ........ G06F 3/0619; G06F 3/065; G06F 3/067; G06F 16/1844; G06F 3/0617; G06F 3/0647
See application file for complete search history.

(56) References Cited

U.S. PATENT DOCUMENTS

| 8,984,243 | B1* | 3/2015 | Chen ..................... | G06F 3/0631 |
| | | | | 711/E12.069 |
| 11,726,684 | B1* | 8/2023 | Sangle .................... | G06F 3/061 |
| | | | | 711/171 |
| 2002/0095470 | A1* | 7/2002 | Cochran ............. | G06F 11/1425 |
| | | | | 709/208 |
| 2015/0269239 | A1* | 9/2015 | Swift ..................... | G06F 16/27 |
| | | | | 707/610 |

(Continued)

FOREIGN PATENT DOCUMENTS

JP            6668309 B2      3/2020

OTHER PUBLICATIONS

Ghemawat, Sanjay, Howard Gobioff, and Shun-Tak Leung. "The Google file system." ACM SIGOPS operating systems review. vol. 37. No. 5. ACM, 2003. (Year: 2003).*

(Continued)

*Primary Examiner* — Charles Rones
*Assistant Examiner* — Hewy H Li
(74) *Attorney, Agent, or Firm* — Volpe Koenig

(57) ABSTRACT

In a computer system including a distributed file system cluster and a block SDS cluster, the distributed file system cluster has a plurality of distributed file system nodes, and stores a management-subject file redundantly in a plurality of volumes managed by a plurality of distributed file system nodes, the block SDS cluster has a plurality of block SDS nodes, and provides a plurality of the volumes on the basis of storage regions of storage apparatuses of the block SDS nodes, and a CPU of a management server is configured to perform control such that a plurality of the volumes storing the file in the distributed file system cluster for redundancy are not volumes based on a storage region of a storage apparatus of one block SDS node.

9 Claims, 12 Drawing Sheets

(56) References Cited

U.S. PATENT DOCUMENTS

2019/0163395 A1    5/2019   Ito et al.
2020/0110550 A1*   4/2020   Naeni ................. G06F 11/2097
2022/0391359 A1*  12/2022   Dronamraju .......... G06F 16/182

OTHER PUBLICATIONS

Raghunath, Arun, Yi Zou, and Anjaneya Chagam. "On Evolving Software Defined Storage Architecture." 2020 IEEE International Conference on Cloud Computing Technology and Science (CloudCom). IEEE, 2020. (Year: 2020).*

* cited by examiner

VOLUME REBALANCING MANAGEMENT INFORMATION 210

DISTRIBUTED FILE SYSTEM INFORMATION TABLE 220 — 2200

| File System | Data Protection Type | Volume |
|---|---|---|
| | 2201 | 2202 |
| FS00 | Triplication | [Vol03, Vol04, Vol05] [Vol06, Vol07, Vol08] |
| FS01 | Erasure Coding | [Vol09, Vol10, Vol11] |

BLOCK SDS VOLUME INFORMATION TABLE 240

| Volume | Volume Name | Size | Node |
|---|---|---|---|
| 2400 | 2401 | 2402 | 2403 |
| Vol00 | xxx | 10TB | N0 |
| Vol01 | yyy | 10TB | N0 |
| Vol02 | zzz | 20TB | N1 |
| Vol03 | fs00-vol00 | 2TB | N2 |
| Vol04 | fs00-vol01 | 2TB | N2 |
| Vol05 | fs00-vol02 | 2TB | N2 |

DISTRIBUTED FILE SYSTEM NODE INFORMATION TABLE 250

| Node | Fault Set |
|---|---|
| 2500 | 2501 |
| M0 | F0 |
| M1 | F1 |
| M2 | F2 |

BLOCK SDS NODE INFORMATION TABLE 230

| Node | Fault Set | Volume |
|---|---|---|
| 2300 | 2301 | 2302 |
| N0 | F0 | Vol00, Vol01 |
| N1 | F1 | Vol02 |
| N2 | F2 | Vol03, Vol04, Vol05 |

FIG. 4

REBALANCING VOLUMES IN COMPUTER SYSTEM COMPRISING UPPER AND LOWER CLUSTER

BACKGROUND OF THE INVENTION

1. Field of the Invention

The present invention relates to a technology of managing the arrangement of volumes in a storage cluster including a plurality of nodes (computers).

2. Description of the Related Art

Scale-out storage systems including a plurality of nodes are known. The scale-out storage systems typically use general-purpose servers as nodes. Since the general-purpose servers are less reliable, the storage systems have redundant configuration formed by arranging a plurality of servers side by side, and, even if a failure occurs in some servers, continue services by using other servers.

Data handled in AI or data analysis is file data or NoSQL storage data, and a storage that stores such data centrally is a data lake. A data lake uses a scale-out storage that provides an interface for files/objects or NoSQL. The scale-out storage uses technologies of distributed file system clusters or NoSQL clusters. The distributed file system clusters and the NoSQL clusters include a plurality of servers, and, in order to protect data from a server failure or the like, store data, which is input by a client, in volumes of a plurality of distributed file system nodes/NoSQL nodes in a distributed manner by making data redundant. The data redundancy method includes duplication or triplication by replication, and erasure coding.

On the other hand, a block SDS that uses a software defined storage (SDS) as a block storage is known. The block SDS configures a storage cluster by using a plurality of nodes, and provides an interface for iSCSI or the like. In order to protect data from a server failure or the like, the block SDS stores data, which is input by a client of iSCSI, in a plurality of nodes in a distributed manner by making data redundant. The data redundancy method includes duplication or triplication by replication, and erasure coding.

In addition, a disaggregated hyper converged infrastructure (dHCI) is known as a storage system. In dHCI, a computer cluster and a storage cluster operate on physically separate servers, and each cluster can be scaled up, and down independently. By applying the idea of dHCI to a distributed file system cluster/NoSQL cluster and a block SDS cluster, the distributed file system cluster/NoSQL cluster and the block SDS cluster can be scaled up and down independently.

There is a technology used when data is stored on a plurality of nodes. In the technology, control is performed, in order to keep the redundancy of data, such that redundant data is not arranged on the same storage node by taking the redundancy of the data into consideration. Japanese Patent No. 6668309 discloses a manner of selecting storage nodes in block SDS such that a pair of pieces of data that is made redundant are not stored on the same storage node.

SUMMARY OF THE INVENTION

For example, there is a fear about a computer system with dHCI configuration including distributed file system cluster/NoSQL cluster and a block SDS cluster that volumes (data storage locations) created for triplication of data by the distributed file system cluster/NoSQL cluster are arranged in one node of the block SDS cluster undesirably. In this case, if a failure occurs in a node of the block SDS cluster, and the node is the node where all the volumes (data) created for triplication of data by the distributed file system cluster/NoSQL cluster are arranged, the volumes become unavailable simultaneously undesirably. In this regard, the technology according to Japanese Patent No. 6668309 is a technology of performing control internally by using information about the inside of block SDS, and cannot be applied to a system with dHCI configuration including a distributed file system cluster/NoSQL cluster and a block SDS cluster.

The present invention has been made in view of the circumstance described above, and an object of the present invention is to provide a technology that can appropriately reduce the occurrence of situations where, in a computer system including a hierarchy of a plurality of storage clusters, data in volumes created for redundancy in an upper storage cluster becomes unavailable.

In order to achieve the object described above, a computer system according to one aspect is a computer system including an upper cluster and a lower cluster, in which the upper cluster has a plurality of first nodes, and stores a management-subject data unit redundantly in a plurality of volumes managed by a plurality of first nodes, the lower cluster has a plurality of second nodes, and provides a plurality of the volumes on the basis of storage regions of storage apparatuses of the second nodes, and a processor of the computer system performs control such that a plurality of the volumes storing the data unit in the upper cluster for redundancy are not volumes based on a storage region of a storage apparatus of one second node.

According to the present invention, in a computer system including a hierarchy of a plurality of storage clusters, it is possible to appropriately reduce the occurrence of situations where data in volumes created for redundancy in an upper storage cluster becomes unavailable.

BRIEF DESCRIPTION OF THE DRAWINGS

FIG. 4 is a configuration diagram of volume rebalancing management information according to the first embodiment;

DESCRIPTION OF THE PREFERRED EMBODIMENTS

Figure 1:
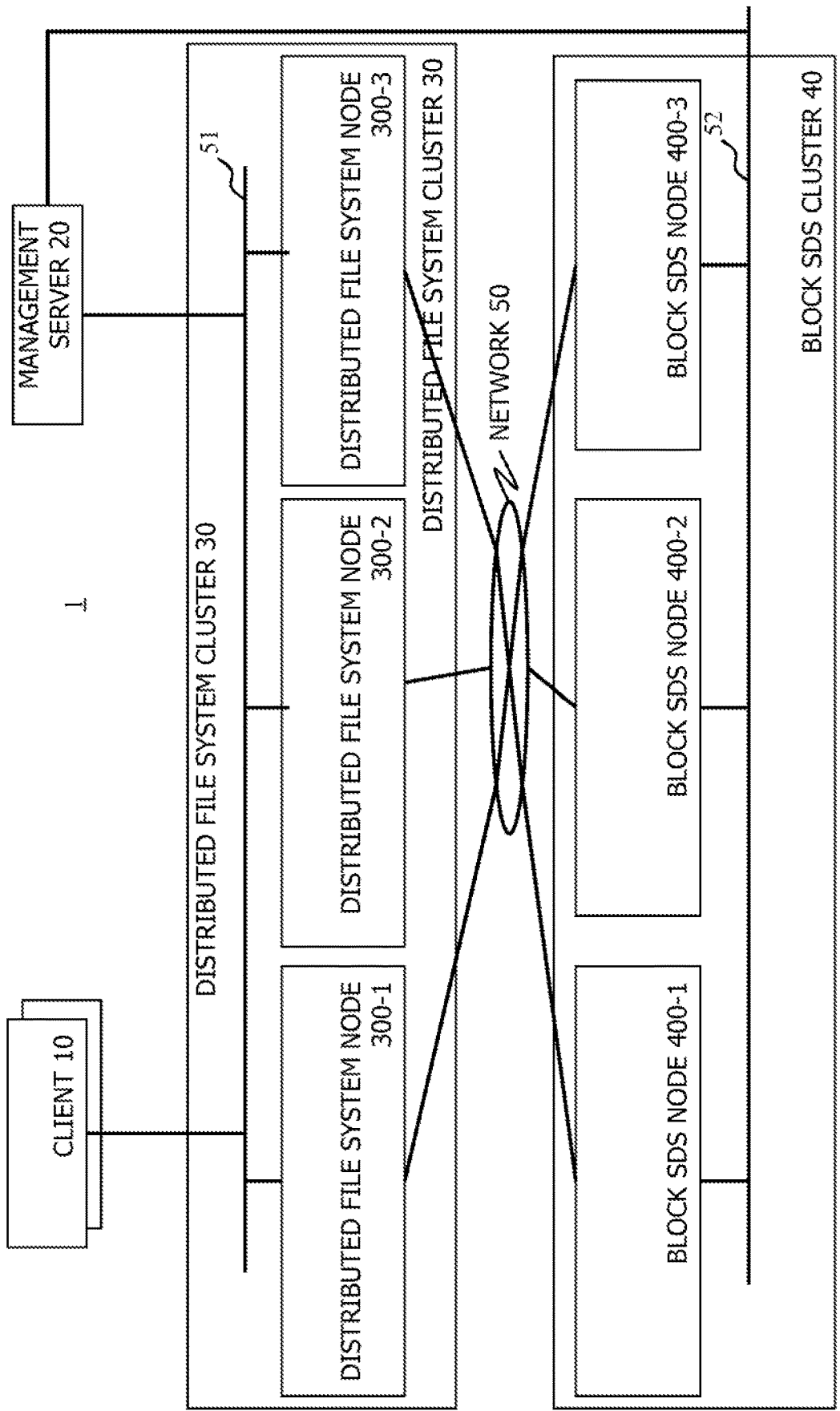
FIG. 1 is an overall configuration diagram of a computer system according to a first embodiment.

Embodiments are explained with reference to the figures. Note that the embodiments explained below are not to limit the invention according to Claims, and also it is not always the case where all of elements and combinations of the elements explained in the embodiments are essential to solutions of the invention.

Note that whereas various types of information are explained by using the expression "aaa table" in some cases in the following explanation, the various types of information may be expressed in a data structure other than tables. In order to indicate that the various types of information do not depend on data structures, the "aaa table" can also be called "aaa information."

In addition, whereas processes are explained as being performed by "programs" in some cases in the following explanation, the processes may be explained as being performed by a processor because the programs perform specified processes while using storage resources (e.g. memories) and/or communication interface devices (e.g. communication ports) as appropriate by being executed by the processor. On the other hand, processes explained as being performed by a processor can be interpreted as being performed by executing one or more programs. The processor typically is a microprocessor like a central processing unit (CPU), but may include a hardware circuit that executes some of processes (e.g. encryption/decoding, compression/decompression).

In addition, when the content of each piece of information is explained, expressions such as "identifier," "name," or "ID" are used about identification information, these are mutually interchangeable. Instead of at least one of them, many types of identification information may be used.

In addition, in the following explanation, in a case where elements of the same type are explained without distinctions being made thereamong, reference characters are used, and in a case where elements of the same type are explained with distinctions being made thereamong, identifiers (e.g. at least one of numbers and reference characters) allocated to the elements are used instead of reference characters of the elements, in some cases.

First Embodiment

FIG. 1 is an overall configuration diagram of a computer system according to a first embodiment.

A computer system 1 has one or more clients 10, a management server 20 as an example of a volume arrangement managing apparatus, a distributed file system cluster 30 as an example of an upper cluster, and a block SDS cluster 40 as an example of a lower cluster. The distributed file system cluster 30 and the block SDS cluster 40 are connected to each other via a network 50. The network 50 is a network such as an intra-site local area network (LAN).

In addition, the clients 10, the distributed file system cluster 30, and the management server 20 are connected to each other by a network 51 such as an intra-site LAN. In addition, the management server 20 and the block SDS cluster 40 are connected to each other by a network 52 such as an in LAN. Note that the types of the networks 50, 51, and 52 are not limited to those described above, and various networks can be used.

The clients 10 are computers, for example, and, for example, use file sharing services provided by the distributed file system cluster 30 by using a file sharing protocol such as a network file system (NFS) or a common Internet file system (CIFS).

The management server 20 includes one or more computers, and is a server that manages the distributed file system cluster 30 and the block SDS cluster 40.

The distributed file system cluster 30 provides to the clients 10 file sharing services for managing files (an example of a data unit) in a sharable distributed manner. The distributed file system cluster 30 includes a plurality of distributed file system nodes 300 (an example of first nodes). Note that whereas the distributed file system cluster 30 includes three distributed file system nodes 300 (300-1, 300-2, and 300-3) in an example depicted in FIG. 1, the present invention is not limited to this, and the number of the distributed file system nodes 300 included in the distributed file system cluster 30 may be any number.

The block SDS cluster 40 provides block storage to the distributed file system cluster 30. The block SDS cluster 40 includes a plurality of block SDS nodes 400 (an example of second nodes). Note that whereas the block SDS cluster 40 includes three block SDS nodes 400 (400-1, 400-2, and 400-3) in the example depicted in FIG. 1, the present invention is not limited to this, and the number of the block SDS nodes 400 included in the block SDS cluster 40 may be any number.

In addition, whereas the computer system 1 includes the distributed file system cluster 30 in the example depicted in FIG. 1, the present invention is not limited to this, and there may be a cluster of database systems instead of the distributed file system cluster 30. The database systems may be RDBMSs or may be NoSQL that manages NoSQL storage data (an example of a data unit). NoSQL provides key-value store (KVS)-type database services to the clients 10.

Figure 2:
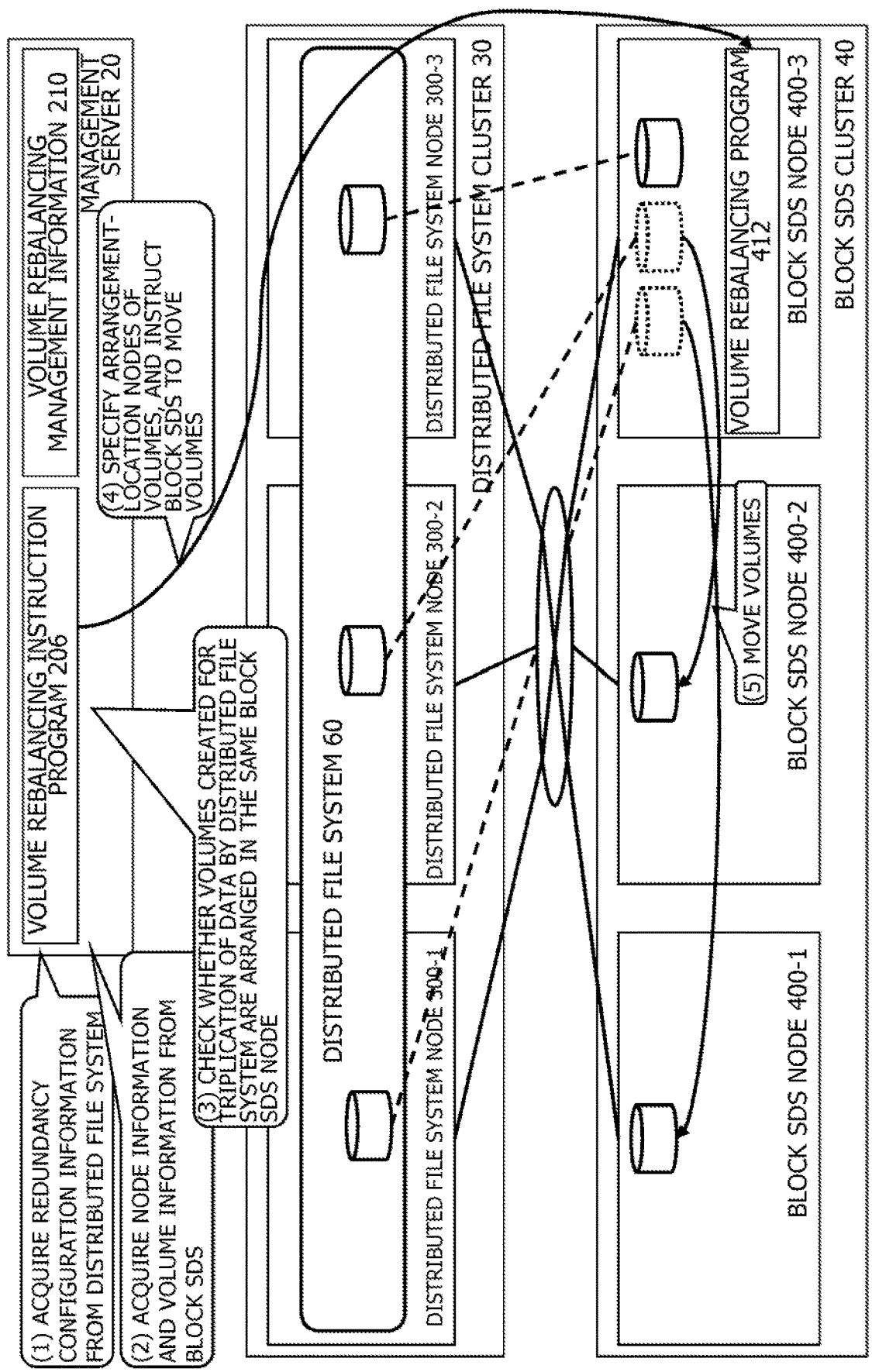
FIG. 2 is a figure for explaining the overview of the first embodiment.

FIG. 2 is a figure for explaining the overview of the first embodiment.

The management server 20 has a volume rebalancing instruction program 206 and volume rebalancing management information 210. The volume rebalancing instruction program 206 executes the following process regularly, when an administrator makes a volume rebalancing request, when an administrator makes a distributed file system creation request, or when an administrator makes a distributed file system expansion request.

The volume rebalancing instruction program 206 acquires, from the distributed file system cluster 30, redundancy configuration information about a distributed file system 60 ((1) in FIG. 2). Here, the redundancy configuration information about the distributed file system 60 is information representing by which volumes data is made redundant (e.g. multiplicated). Note that an interface that the volume rebalancing instruction program 206 uses to acquire the redundancy configuration information about the distributed file system 60 is a REST API, for example, but this is not the sole example.

Here, in order to protect data from a failure or the like, the distributed file system 60 stores data, which is input by a client 10, in the plurality of distributed file system nodes 300 in a distributed manner by making data redundant. A method of making data redundant by the distributed file system 60 may be multiplication (duplication, triplication, etc.) by replication or erasure coding, for example. Note that the method of making data redundant is mainly triplication by replication in an example explained in the present embodiment. In a case where triplication by replication is executed, data input by a client 10 is copied and stored on three volumes managed by different distributed file system nodes 300.

Next, the volume rebalancing instruction program 206 acquires, from the block SDS cluster 40, node information about the clock SDS nodes 400 and volume information about volumes managed by the block SDS cluster 40 ((2) in FIG. 2). Here, the node information about the block SDS nodes 400 includes node identifiers and fault sets of the block SDS nodes 400, and volume identifiers of volumes retained by the block SDS noes 400. In addition, the volume information about the volumes managed by the block SDS cluster 40 includes volume identifiers, volume names, volume sizes, and node identifiers of nodes storing the volumes. Note that, for example, a REST API is used as an interface through which the node information and the volume information are acquired, but this is not the sole example.

Next, the volume rebalancing instruction program 206 checks whether or not the volumes created for triplication of data by the distributed file system 60 are arranged in the same block SDS node 400 ((3) in FIG. 2). In a case where a result of this check represents that the volumes created for triplication of data by the distributed file system 60 are arranged in the same block SDS node 400, the volume rebalancing instruction program 206 proceeds to a process (4) in FIG. 2, and otherwise ends the process.

Next, the volume rebalancing instruction program 206 specifies arrangement-location block SDS nodes 400 where some volumes stored on the same block SDS node 400 are to be arranged newly, and instructs the block SDS cluster 40 to move the volumes ((4) in FIG. 2). For example, a REST API is used as an interface for the volume rebalancing instruction program 206 to give the instruction, but this is not the sole example. Here, when volumes are to be moved, for example, in a case where two volumes are arranged in the same block SDS node 400, the volume rebalancing instruction program 206 specifies another block SDS node 400 as an arrangement location of either volume such that the volume is moved to the block SDS node 400. In addition, for example, in a case where three volumes are arranged in the same block SDS node 400, the volume rebalancing instruction program 206 specifies other block SDS nodes 400 as arrangement locations of any two of the volumes such that the two volumes are moved to the respective block SDS nodes 400.

Next, a volume rebalancing program 412 in the block SDS node 400 receives the instruction from the volume rebalancing instruction program 206, and moves, to the specified arrangement-location block SDS node(s) 400, the volume((s) specified by the instruction ((5) in FIG. 2).

The process described above can arrange volumes created for triplication of data by the distributed file system 60 in different block SDS nodes 400. Thereby, it is possible to reduce the occurrence of situations where all volumes created for triplication become unavailable when a failure occurs in any of the block SDS nodes 400.

Note that whereas the management server 20 executes the volume rebalancing instruction program 206 in the example depicted above, the present invention is not limited to this, and, for example, a distributed file system node 300 in the distributed file system cluster 30 may execute the volume rebalancing instruction program 206.

Figure 3:
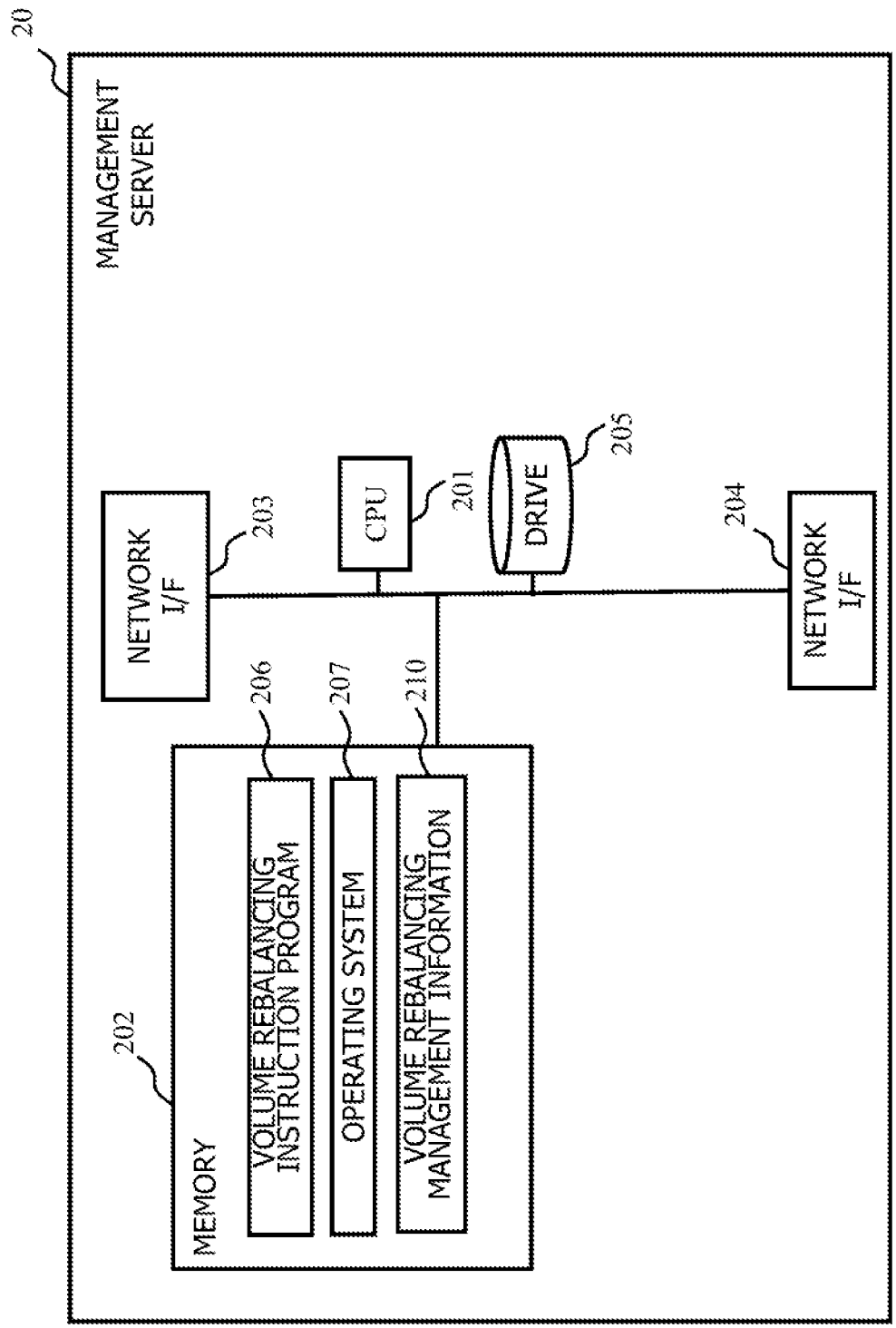
FIG. 3 is a configuration diagram of a management server according to the first embodiment.

FIG. 3 is a configuration diagram of the management server according to the first embodiment.

The management server 20 has a memory 202, a CPU 201, network interfaces 203 and 204, and a drive 205. The memory 202, the CPU 201, the network interfaces 203 and 204, and the drive 205 are interconnected by a communication path such as a bus.

The CPU 201 executes programs stored on the memory 202. The network interface 203 is an interface for communication with the clients 10 and the distributed file system nodes 300 via the network 51. The network interface 204 is an interface for communication with the block SDS cluster nodes 400 via the network 52. These network interfaces 203 and 204 may be a single interface or may be independent interfaces.

For example, the drive 205 is a hard disk drive (HDD) or a solid state drive (SSD), and stores programs and information used for controlling the management server 20.

For example, the memory 202 is a random access memory (RAM), and stores programs and information used for controlling the management server 20. Specifically, for example, the memory 202 stores the volume rebalancing instruction program 206, an operating system 207, and a volume rebalancing management information 210. Note that the programs and information stored on the memory 202 may be read out from the drive 205 to the memory 202 by the CPU 201.

The volume rebalancing instruction program 206 is a program that gives an instruction for rebalancing volumes provided by the block SDS cluster 40. The operating system 207 is a program that performs the overall control of the management server 20. The volume rebalancing management information 210 is information used for managing a process of rebalancing volumes provided by the block SDS cluster 40.

FIG. 4 is a configuration diagram of the volume rebalancing management information according to the first embodiment.

The volume rebalancing management information 210 has a distributed file system node information table 250, a distributed file system information table 220, a block SDS node information table 230, and a block SDS volume information table 240.

The distributed file system node information table 250 manages information about distributed file system nodes 300 included in the distributed file system cluster 30. The distributed file system node information table 250 has an entry for each distributed file system node 300. Each entry of the distributed file system node information table 250 has fields of a node (Node) 2500 and a fault set (Fault Set) 2501. In the node 2500, an identifier (node identifier) of a distributed file system node 300 corresponding to the entry, is stored. In the fault set 2501, an identifier of a fault set to which the distributed file system node 300 corresponding to the entry belongs is stored. Here, the fault set is a set of configurations that are configured such that a failure therein does not have an influence on another set, in the computer system 1 having redundancy configuration in preparation for a failure of a power supply or a network switch.

The distributed file system information table 220 manages information about one or mere distributed file systems 60 configured by the distributed file system cluster 30. The distributed file system information table 220 has an entry for each distributed file system 60. Each entry of the distributed file system information table 220 has fields of a file system 2200, a data protection type 2201, and a volume 2202.

In the file system 2200, an identifier of a distributed file system corresponding to the entry is stored. In the data protection type 2201, the type of a method for data protection (redundancy) in the distributed file system corresponding to the entry is stored. For example, examples of the method for data redundancy include data triplication, erasure coding, and the like. In the volume 2202, a set of volumes as the subjects of the redundancy method corresponding to the entry is stored.

The distributed file system information table 220 depicted in FIG. 4 represents that, for example: by a triplication method by replication, a distributed file system FS00 has triplicated data by using volumes Vo103, Vo104, and Vo105, and triplicated data by using volumes Vo106, Vo107, and Vo108; and also a distributed file system FS01 has stored data by erasure coding by using Vo109, Vo110, and Vo111.

The block SDS node information table 230 manages information about block SDS nodes 400 included in the block SDS cluster 40. The block SDS node information table 230 has an entry for each block SDS node 400. Each entry in the block SDS node information table 230 has fields of a node (Node) 2300, a fault set 2301, and a volume (Volume) 2302.

In the node 2300, an identifier of a block SDS node 400 corresponding to the entry is stored. In the fault set 2301, an identifier of a fault set to which the block SDS node 400 corresponding to the entry belongs is stored. In the volume 2302, identifiers of volumes retained by the block SDS node 400 corresponding to the entry are stored.

The block SDS volume information table 240 manages information about volumes in the block SDS cluster 40. The block SDS volume information table 240 has an entry for each volume. Each entry of the block SDS volume information table 240 includes fields of a volume (Volume) 2400, a volume name (Volume Name) 2401, a size (Size) 2402, and a node 2403. In the volume 2400, an identifier (volume identifier) of a volume corresponding to the entry is stored. In the volume name 2401, a name (volume name) of the volume corresponding to the entry is stored. The volume name is, for example, a name, specified for the volume by a volume creator when the volume is created. In the size 2402, the size of the volume corresponding to the entry is stored. In the node 2403, an identifier of a node retaining the volume corresponding to the entry is stored.

Figure 5:
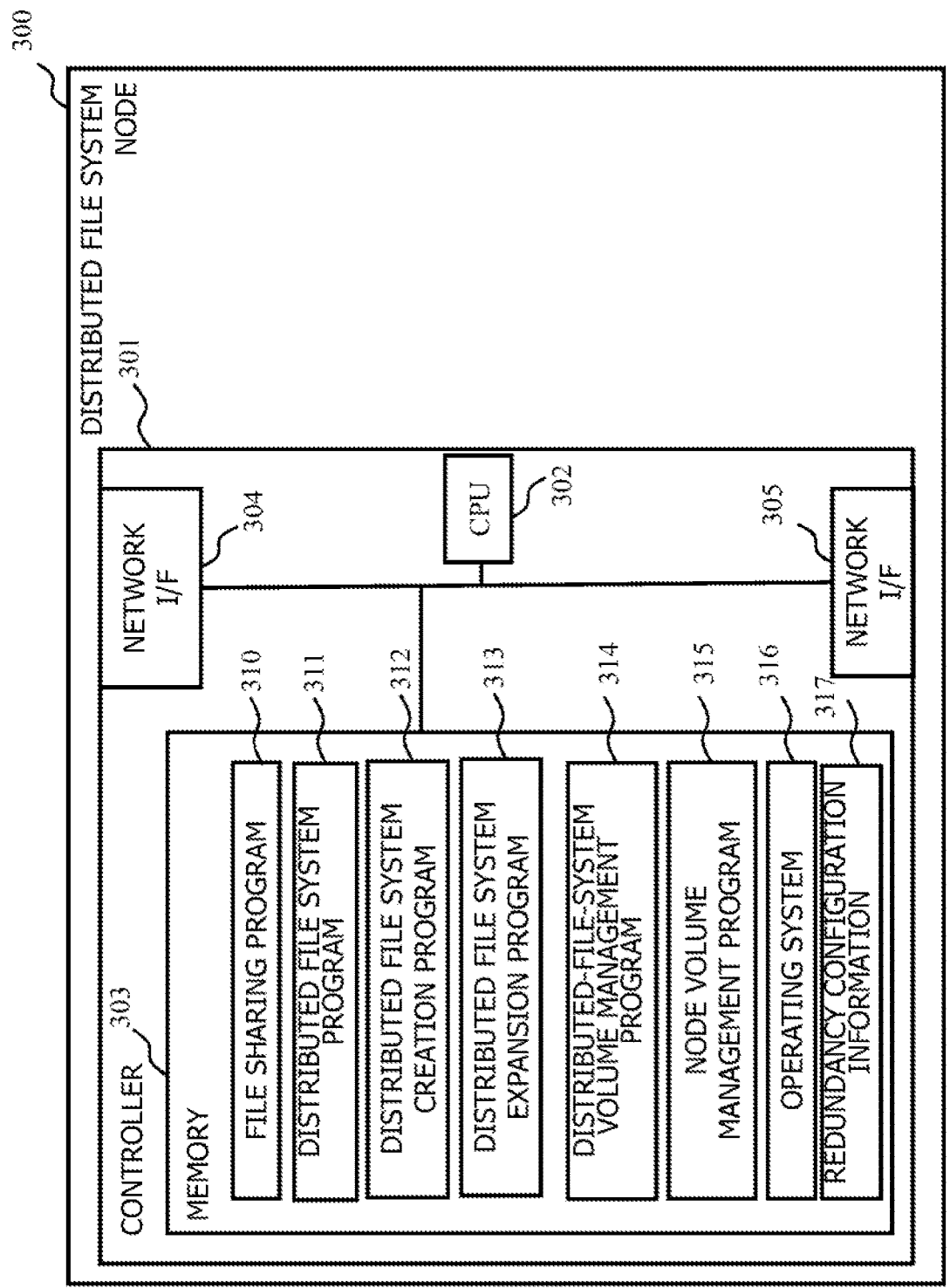
FIG. 5 is a configuration diagram of a distributed file system node according to the first embodiment.

FIG. 5 is a configuration diagram of a distributed file system node according to the first embodiment.

The distributed file system node 300 has a controller 301. The controller 301 has a memory 303, a CPU 302, and network interfaces 304 and 305. The memory 303, the CPU 302, and the network interfaces 304 and 305 are interconnected by a communication path such as a bus.

The CPU 302 executes programs stored on the memory 303. The network interface 304 is an interface for communication with the clients 10 and other distributed file system nodes 300 via the network 51. The network interface 305 is an interface for communication with the block SDS cluster 40 via the network 50. These network interfaces 304 and 305 may be a single interface or may be independent interfaces.

The memory 303 stores programs and information used for controlling the distributed file system node 300. Specifically, for example, the memory 303 stores a file sharing program 310, a distributed file system program 311, a distributed file system creation program 312, a distributed file system expansion program 313, a distributed-file-system volume management program 314, a node volume management program 315, an operating system (OS) 316, and redundancy configuration information 317. Note that the programs and information stored on the memory 303 may be stored on a storage apparatus (not depicted) of the distributed file system node 300. In this case, these are read out to the memory 303, and executed by the CPU 302.

The file sharing program 310 is a program that provides an interface between the distributed file system node 300 and the clients 10 using a file sharing protocol. The distributed file system program 311 is a program that provides, to the clients 10, the distributed file system 60 configured between the plurality of distributed file system nodes 300. The distributed file system creation program 312 is a program that receives a request (distributed fie system creation request) for creating the distributed file system 60 from the management server 20 made by an administrator, and creates the distributed file system 60. The distributed file system expansion program 313 is a program that receives a request (distributed file system expansion request) for expanding the distributed file system 60 from the management server 20 made by an administrator, and expands the distributed file system 60. The distributed-file-system volume management program 314 is a program that receives a volume creation request from the distributed file system creation program 312 or the distributed file system expansion program 313, and requests a block SDS cluster 40 to create volumes. The node volume management program 315 is a program that receives a request for allocating a volume to the distributed file system node 300 from the distributed-file-system volume management program 314, and allocates the volume to the distributed file system node 300. The distributed-file-system volume management program 314 and the node volume management program 315 may be a container storage interface (CSI) driver in a container environment such as Kubernetes. The operating system 316 is a program that performs the overall control of the distributed file system node 300.

In the redundancy configuration information 317, information about volumes created for redundancy of data and managing the data in the distributed file system cluster 30 is stored. Specifically, the redundancy configuration information 317 may be information similar to the distributed file system information table 220. Note that the redundancy configuration information 317 may be stored only on the memory 303 of a distributed file system node 300 which serves as a representative of the distributed file system cluster 30.

Figure 6:
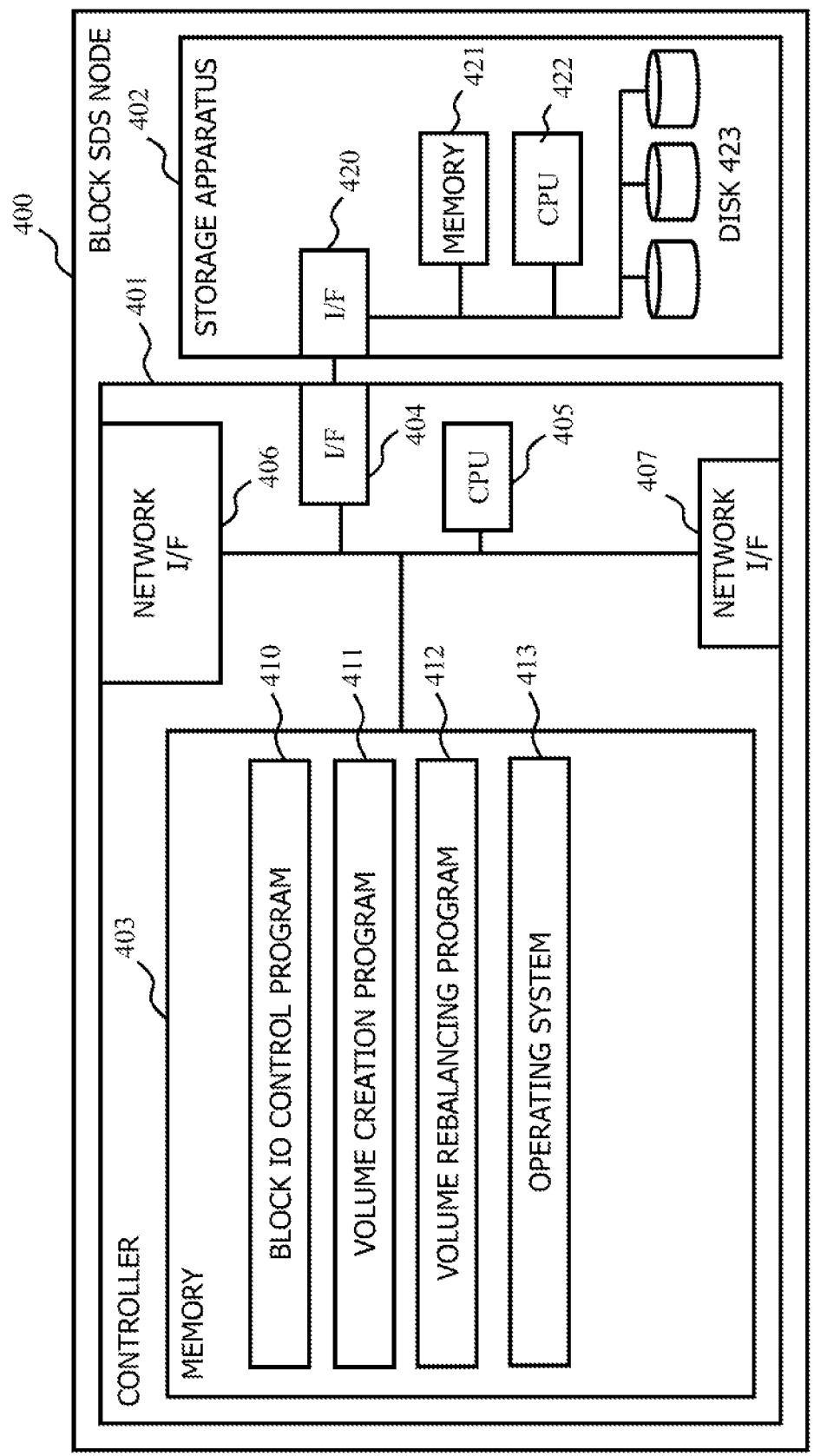
FIG. 6 is configuration diagram of a block SDS node according to the first embodiment.

FIG. 6 is a configuration diagram of a block SDS node according to the first embodiment.

The block SDS node 400 has a controller 401 and storage apparatus 402. The controller 401 has a, memory 403, a CPU 405, network interfaces 406 and 407, and an interface 404. The memory 403, the CPU 405, the network interfaces 406 and 407, and the interface 404 are interconnected by a communication path such as a bus.

The CPU 405 executes programs stored on the memory 403. The network interface 406 is an interface for communication with the distributed file system cluster 30 (the distributed file system nodes 300) via the network 50. The interface 404 is an interface for communication with the storage apparatus 402, and is connected to an interface 420 mentioned later of the storage apparatus 402. The network interface 407 is an interface for communication with other block SDS nodes 400 or the management server 20 via the network 52.

The memory 403 stores programs and information used for controlling the block SDS node 400. Specifically, for example, the memory 403 stores a block IO control program 410, a volume creation program 411, the volume rebalancing program 412, and an operating system 413. Note that the programs and information stored on the memory 403 may be stored on the storage apparatus 402. In this case, the programs and information are read out from the storage apparatus 402 to the memory 403 by the CPU 405.

The block IO control program 410 is a program that processes an IO request from the distributed file system cluster 30. For example, the IO request is an SCSI command using a protocol of iSCSI or Fibre Channel (FC). The volume creation program 411 is a program that receives a volume creation request from the distributed file system cluster 30, and creates volumes. The volume rebalancing program 412 is a program that receives a volume rebalancing request from the management server 20 or responds to a process inside the block SDS cluster 40, and executes volume rebalancing. Specifically, the volume rebalancing program 412 moves volumes between block SDS nodes 400 in order to solve non-uniformity of free capacities and performance among the block SDS nodes 400. The operating system 413 is a program that performs the overall control of the block SDS node 400.

The storage apparatus 402 has a memory 421, a CPU 422, one or more disks 423, and an interface 420. The memory 421, the CPU 422, the disk 423, and the interface 420 are interconnected by a communication path such as a bus. The interface 420 is an interface for communication with the controller 401. The memory 421 and the disk 423 store programs and data. The CPU 422 executes programs in the memory 421 on the basis of orders from the controller 401. The storage apparatus 402 may provide, to the controller 401, a storage functionality in a block format such as FC-SAN.

Next, processing operation by the computer system 1 according to the first embodiment is explained in detail.

Next, a distributed file system creation process 6000 is explained.

Figure 7:
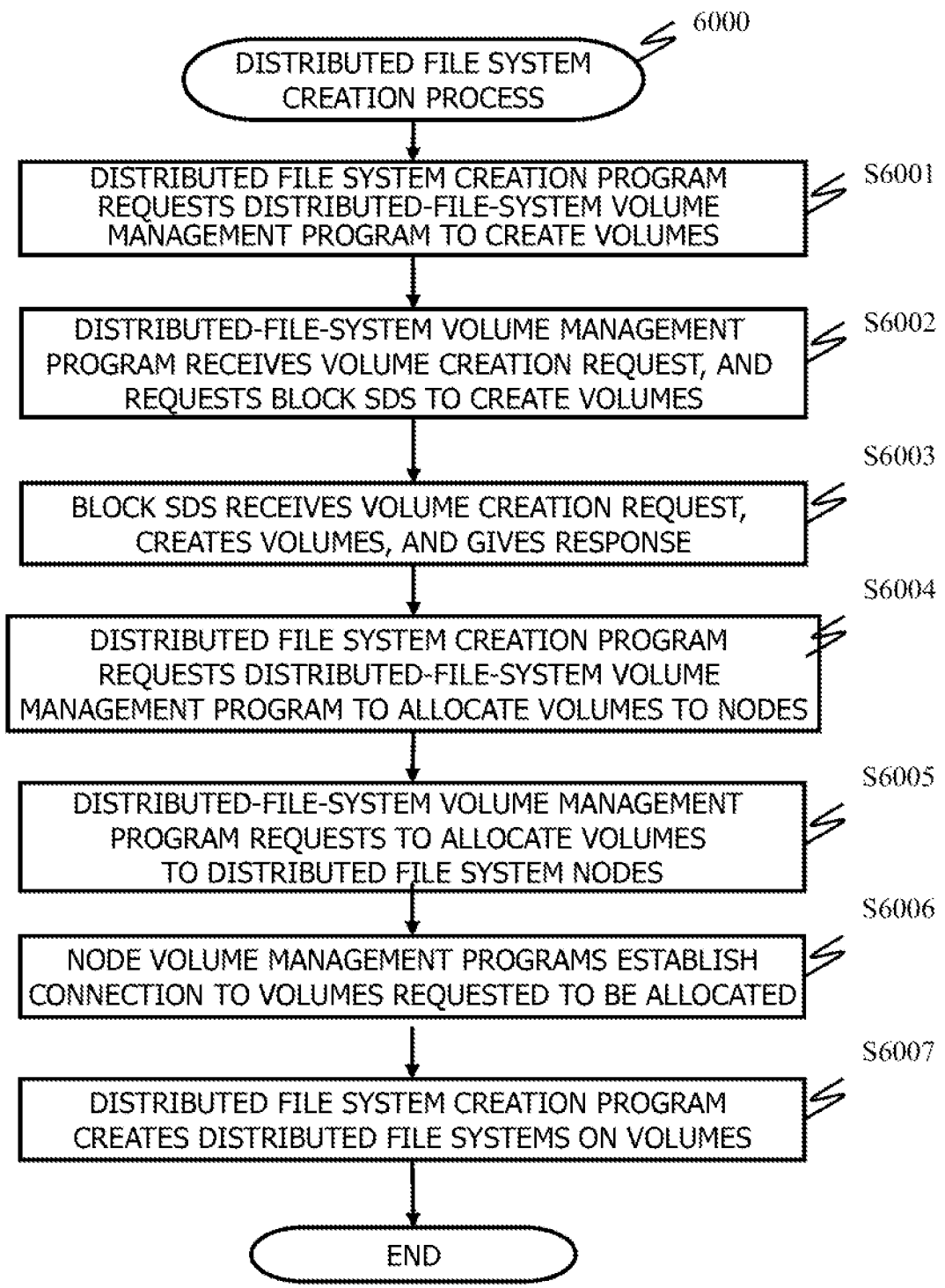
FIG. 7 is a flowchart of a distributed file system creation process according to the first embodiment.

FIG. 7 is a flowchart of the distributed file system creation process according to the first embodiment.

For example, the distributed file system creation process 6000 is executed in a case where the distributed file system creation program 312 receives a request for creating a distributed file system made by an administrator from the management server 20. The distributed file system creation process 6000 is a process performed by the CPU 302 executing the distributed file system creation program 312.

The distributed file system creation program 312 (strictly speaking, the CPU 302 executing the distributed file system creation program 312) receives the distributed file system creation request from the management server 20, and requests the distributed-file -system volume management program 314 to create a plurality of volumes to be used for the distributed file system (S6001).

The distributed-file-system volume management program 314 receives the request for creating volumes, and requests the block SDS cluster 40 to create volumes (S6002).

The volume creation program 411 of the block SDS cluster 40 (any of the block SDS node 400 in the block SDS cluster 40) receives the volume creation request, creates a plurality of volumes by using storage regions of the storage apparatuses 402 of the block SDS nodes 400, and gives a response to the volume creation request (S6003).

The distributed file system creation program 312 receives the response to the volume creation request, and requests the distributed-file-system volume management program 314 to allocate the plurality of created volumes to the distributed file system nodes 300 (S6004).

The distributed-file-system volume management program 314 requests the node volume management program 315 of each distributed file system node 300 included in the distributed file system cluster 30 to allocate any of the generated volumes to the distributed file system node 300 (S6005).

The node volume management programs 315 receive the requests for allocating the volumes to the distributed file system nodes 300, and connect the distributed file system nodes 300 to the volumes specified by the allocation requests (S6006).

The distributed file system creation program 312 creates the distributed file systems 60 on the plurality of volumes connected to the distributed file system nodes 300 (36007), and ends the distributed file system creation process 6000.

According to the distributed file system creation process 6000 described above, the distributed file systems 60 are created on the distributed file system cluster 30, file sharing services are provided to the clients 10 by the file sharing programs 310, and it becomes possible for the clients 10 to read and write files from and to the distributed file systems 60.

Next, a distributed file system expansion process 7000 is explained.

Figure 8:
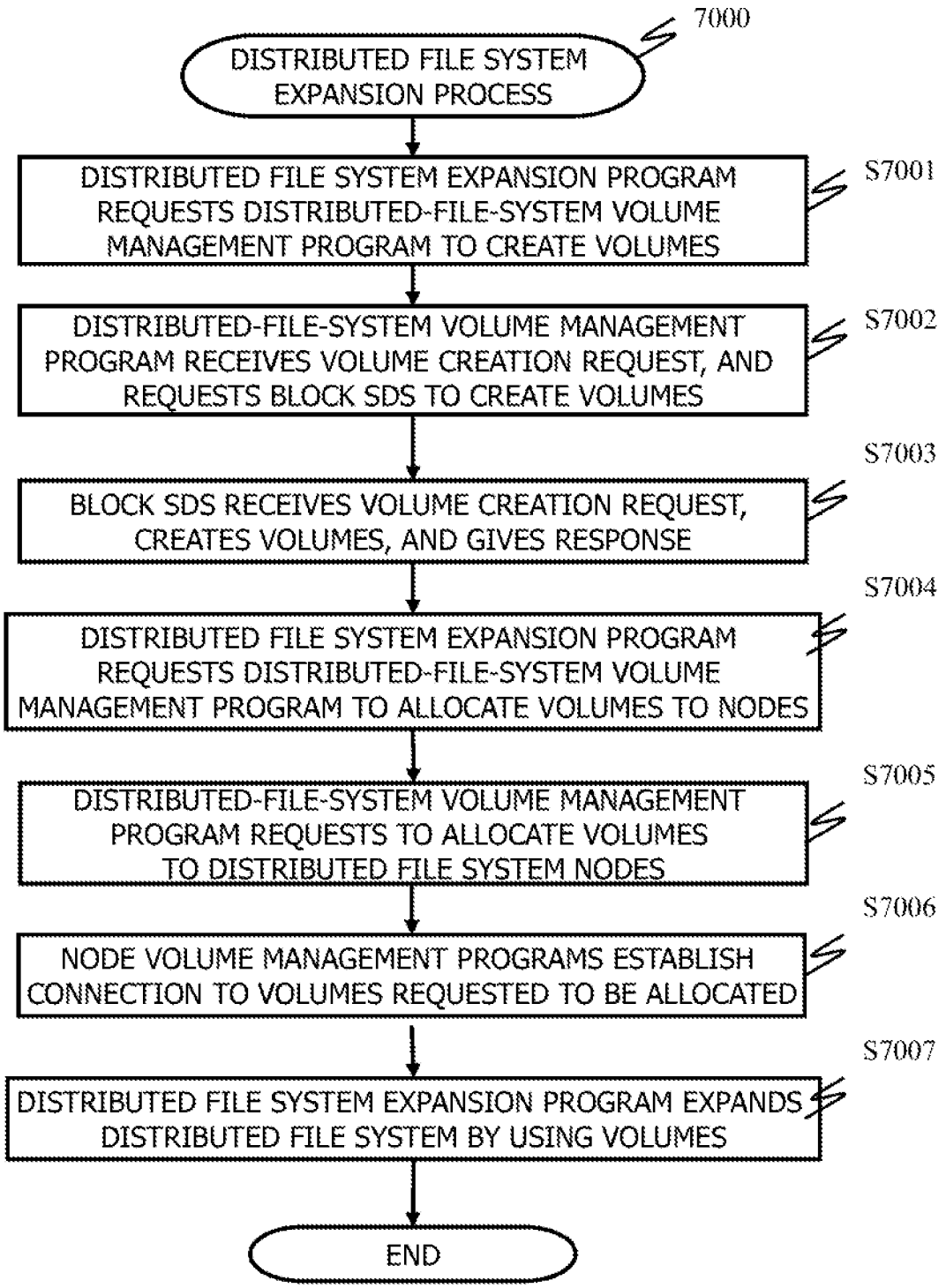
FIG. 8 is a flowchart of a distributed file system expansion process according to the first embodiment.

FIG. 8 is a flowchart of the distributed file system expansion process according to the first embodiment.

The distributed file system expansion process 7000 is a process executed in a case where the capacity of a distributed file system 60 becomes insufficient or in other cases, and, for example, is executed in a case where the distributed file system expansion program 313 receives a request for expanding the distributed file system made by an administrator from the management server 20. The distributed file system expansion process 7000 is a process performed by the CPU 302 executing the distributed file system expansion program 313.

The distributed file system expansion program 313 (strictly speaking, the CPU 302 executing the distributed file system expansion program 313) receives the distributed file system expansion request from the management server 20, and requests the distributed-file-system volume management program 314 to create a plurality of volumes to be used for the distributed file system (S7001).

The distributed-file-system volume management program 314 receives the request for creating volumes, and requests the block SDS cluster 40 to create volumes (S7002).

The volume creation program 411 of the block SDS cluster 40 (any of the block SDS nodes 400 in the block SDS cluster 40) receives the volume creation request, creates a plurality of volumes by using storage regions of the storage apparatuses 402 of the block SDS nodes 400, and gives a response to the volume expansion request (S7003).

The distributed file system expansion program 313 receives the response to the volume creation request, and requests the distributed-file-system volume management program 314 to allocate the plurality of created volumes to the distributed file system nodes 300 (S7004).

The distributed-file-system volume management program 314 requests the node volume management program 315 of each distributed file system node 300 included in the distributed file system cluster 30 to allocate any of the generated volumes to the distributed file system node 300 (S7005).

The node volume management programs 315 receive the requests for allocating the volumes to the distributed file system nodes 300, and connect the distributed file system nodes 300 to the volumes specified the allocation requests (S7006).

The distributed file system expansion program 313 expands the distributed file system 60 by using the added volumes (S7007), and ends the distributed file system expansion process 7000.

Next, a volume moving process 8000 is explained.

Figure 9:
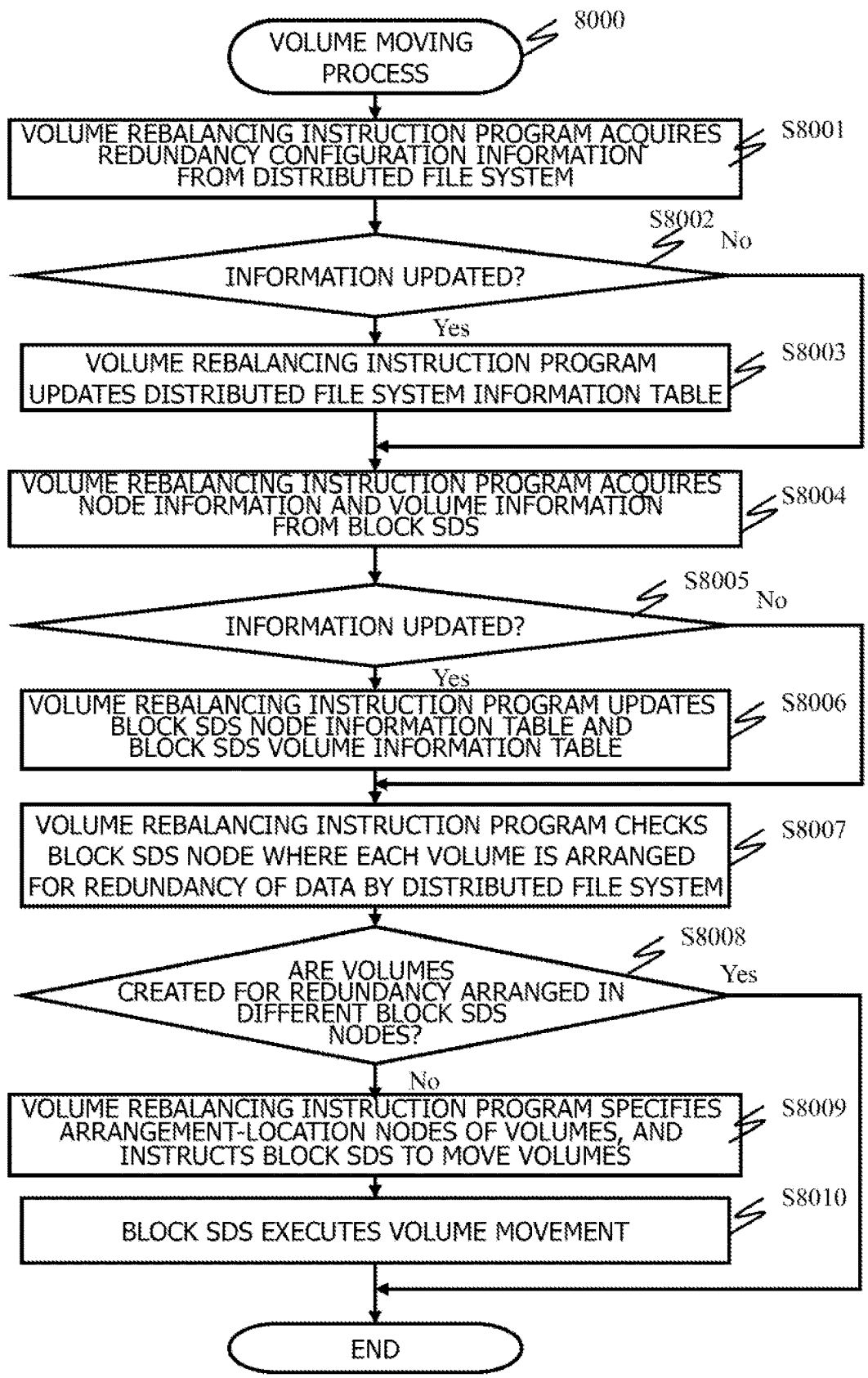
FIG. 9 is a flowchart of a volume moving process according to the first embodiment.

FIG. 9 is a flowchart of the volume moving process according to the first embodiment.

For example, the volume moving process 8000 is executed by the volume rebalancing instruction program 206 of the management server 20 regularly or when volume rebalancing is requested by an administrator. Note that the volume moving process 8000 may be executed by being called as an extension of the distributed file system creation process 6000 or the distributed file system expansion process 7000 after the distributed file system creation process 6000 or the distributed file system expansion process 7000 is completed.

The volume rebalancing instruction program 206 (strictly speaking, the CPU 201 executing the volume rebalancing instruction program 206) acquires redundancy configuration information from the distributed file system 60 (S8001). Here, for example, the redundancy configuration information includes a set of an identifier of the distributed file system 60, the type of a method of data protection (redundancy) in the distributed file system 60, and volumes which are the subjects of the redundancy method.

The volume rebalancing instruction program 204 compares the acquired redundancy configuration information and information stored in the distributed file system information table 220 of the volume rebalancing management information 210 with each other, and checks whether or not the information has been updated (S8002).

In a case where, as a result of this, the information has not been updated (S8002: No), the volume rebalancing instruction program 206 proceeds to a process at S8004.

On the other hand, in a case where the information has been updated (S8002: Yes), the volume rebalancing instruction program 206 updates the distributed file system information table 220 on the basis of the redundancy configuration information (S8003), and proceeds to a process at S8004.

At Step S8004, the volume rebalancing instruction program 206 acquires node information and volume information from the block SDS cluster 40. Here, for example, the node information includes identifiers of the block SDS nodes 400, identifiers of fault sets to which the block SDS nodes 400 belong, and identifiers of volumes retained by the block SDS nodes 400. In addition, for example, the volume information includes identifiers of volumes, volume names, volume sizes, and identifiers of nodes retaining the volumes.

The volume rebalancing instruction program 206 compares the node information and volume information about the block SDS cluster 40 with information stored in the block SDS node information table 230 and the block SDS volume information table 240, and checks whether or not the information has been updated (S8005).

In a case where, as a result of this, the information has not been updated (S8005: No), the volume rebalancing instruction program 206 proceeds to a process at S8007. On the other hand, in a case where the information has been updated (S8005: Yes), the volume rebalancing instruction program 206 updates the block SDS node information table 230 and the block SDS volume information table 240 (S8006).

At Step S8007, the volume rebalancing instruction program 206 refers to the volume rebalancing management information 210, and checks block SDS nodes 400 where a plurality of volumes created for redundancy of data by the distributed file system 60 are arranged.

The volume rebalancing instruction program 206 checks whether or not all of a plurality of volumes created for redundancy (e.g. triplication, erasure coding) of data by the distributed file system 60 are arranged in different block SDS nodes 400 (S8008).

In a case where, as a result of this, all the volumes created for redundancy are arranged in different block SDS nodes 400 (S8008; Yes), this means that even if one block SDS node 400 malfunctions, the data can be acquired or restored by using the data in the other block SDS nodes 400, and therefore, the volume rebalancing instruction program 206 ends the volume moving process 8000.

On the other hand, in a case where all the volumes created for redundancy are not arranged in different block SDS nodes 400 (S8008: No), this means that a plurality of volumes in the volumes are arranged in the same block SDS node 400, and therefore, the volume rebalancing instruction program 206 determines arrangement locations of the volumes such that the arrangement locations of all the volumes become different block SDS nodes 400, specifies the determined arrangement-location block SDS nodes 400, and instructs the block SDS cluster 40 to move the volumes (S8009).

The volume rebalancing program 412 of the block SDS cluster 40 receives the volume movement instruction, moves the volumes according to the instruction to the arrangement-location block SDS nodes 400 according to the instruction (S8010), and ends the volume moving process 8000.

According to the volume moving process 8000 described above, a plurality of volumes created for redundancy of data by the distributed file system 60 get to be arranged in different block SDS nodes 400. Thereby, it is possible to reduce the occurrence of situations where all volumes created for redundancy become unavailable at a time of a failure of a block SDS node 400.

Second Embodiment

Next, a computer system according to a second embodiment is explained.

Here, since the basic configuration of the computer system according to the second embodiment is similar to the basic configuration of the computer system 1 according to the first embodiment, reference characters identical to those of the computer system 1 according to the first embodiment are used for similar configurations for convenience.

The computer system according to the second embodiment performs a volume moving process 9000 instead of the volume moving process 8000 in the computer system according to the first embodiment.

Next, the volume moving process 9000 is explained.

Figure 10:
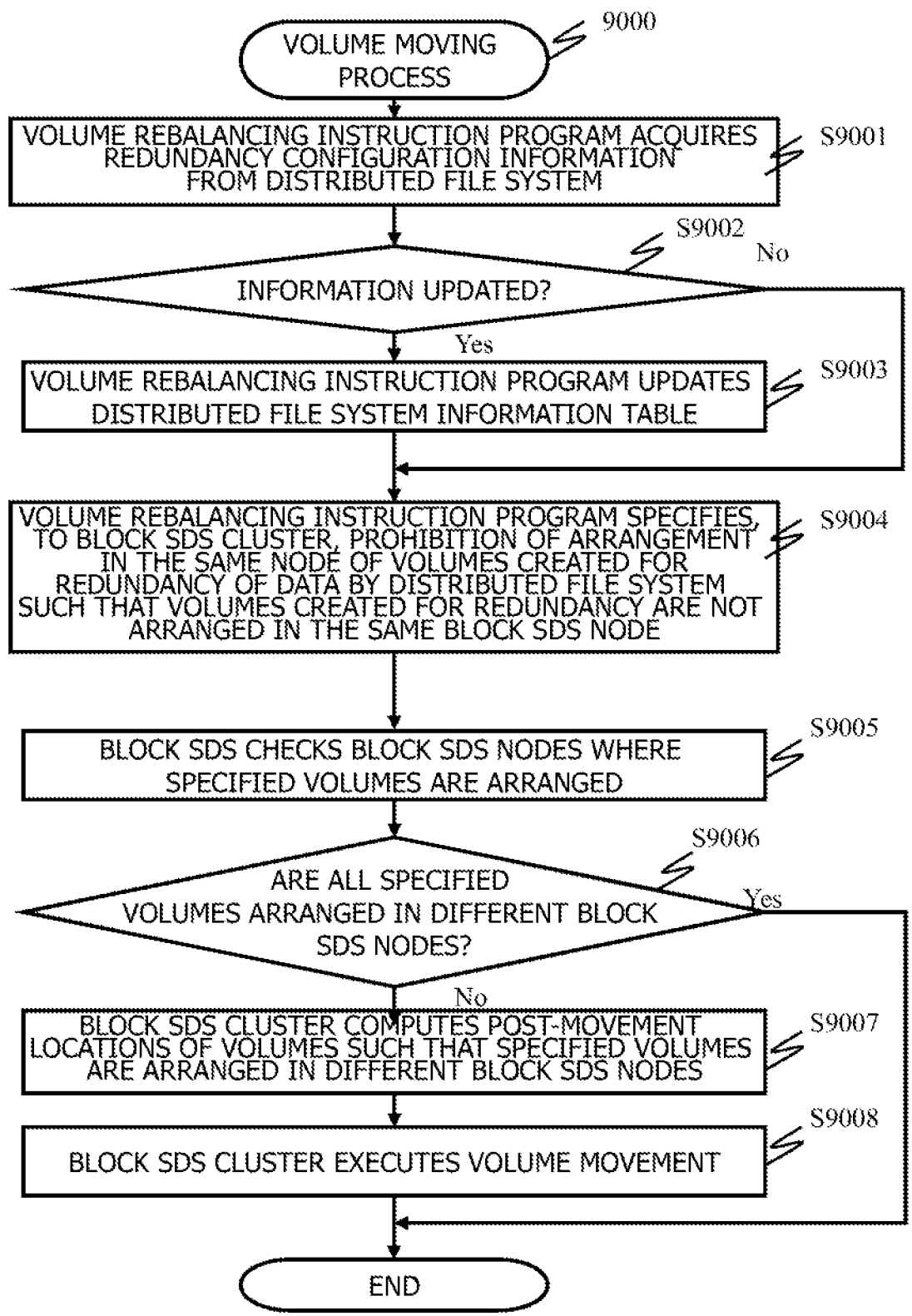
FIG. 10 is a flowchart of the volume moving process according to a second embodiment.

FIG. 10 is a flowchart of the volume moving process according to the second embodiment.

For example, the volume moving process 9000 is executed by by the volume rebalancing instruction program 206 of the management server 20 regularly or when volume rebalancing is requested by an administrator. Note that the volume moving process 9000 may be executed by being called as an extension of the distributed file system creation process 6000 or the distributed file system expansion process 7000 after the distributed file system creation process 6000 or the distributed file system expansion process 7000 is completed.

The volume rebalancing instruction program 206 (strictly speaking, the CPU 201 executing the volume rebalancing instruction program 206) acquires redundancy configuration information from the distributed file system 60 (S9001). Here, for example, the redundancy configuration information includes a set of an identifier of the distributed file system 60, the type of a method of data protection (redundancy) in the distributed file system 60, and volumes which are the subjects of the redundancy method.

The volume rebalancing instruction program 206 compares the acquired redundancy configuration information and information stored in the distributed file system information table 220 of the volume rebalancing management information 210 with each other, and checks whether or not the information has been updated (S9002).

In a case where, as a result of this, the information has not been updated (S9002: No), the volume rebalancing instruction program 206 proceeds to a process at S9004.

On the other hand, in a case where the information has been updated (S9002: Yes), the volume rebalancing instruction program 206 updates the distributed file system information table 220 on the basis of the redundancy configuration information (S9003), and proceeds to a process at S9004.

At Step S9004, the volume rebalancing instruction program 206 refers to the volume rebalancing management information 210, specifies, to the block SDS cluster 40, a prohibition of arrangement in the same node of volumes created for redundancy of data by the distributed file system 60 such that the volumes created for redundancy are not arranged in the same block SDS node 400 (S9004). Here, the prohibition of arrangement in the same node includes information (an example of redundancy volume information) identifying a plurality of volumes created for redundancy.

The volume rebalancing program 412 of the block SDS cluster 40 (any of the block SDS nodes 400 in the block SDS cluster 40) receives the specification of the prohibition of arrangement in the same node, and check block SDS nodes 400 where the volumes specified by the prohibition of arrangement in the same node are arranged (S9005).

The volume rebalancing program 412 checks whether or not all of a plurality of the volumes specified by the prohibition of arrangement in the same node are arranged in different block SDS nodes 400 (S9006).

In a case where, as a result of this, all of the plurality of specified volumes are arranged in different block SDS nodes 400 (S9005: Yes), this means that even if one block SDS node 400 malfunctions, the data can be acquired or restored by using the data in the other block SDS nodes 400, and therefore, the volume rebalancing program 412 of the block SDS ends the volume moving process 9000.

On the other hand, in a case where all of the specified volumes are not arranged in different block SDS nodes 400 (S9006: No), the volume rebalancing-program 412 computes movement-subject volumes and their post-movement-location block SDS nodes 400 such that the specified volumes are arranged in different block SDS nodes 400 (S9007).

The volume rebalancing program 412 of the block SDS cluster 40 moves the movement-subject volumes to the computed post-movement-location block SDS nodes 400 (S9008), and ends the volume moving process 9000.

According to the volume moving process 9000 described above, a plurality of volumes created for redundancy of data by the distributed file system 60 get to be arranged in different block SDS nodes 400. Thereby it is possible to reduce the occurrence of situations where all volumes created for redundancy become unavailable at a time of a failure of a block SDS node 400.

Third Embodiment

Next, a computer system according to a third embodiment is explained.

Here, since the basic configuration of the computer system according to the third embodiment is similar to the basic configuration of the computer system 1 according to the first embodiment, reference characters identical to those of the computer system 1 according to the first embodiment are used for similar configurations for convenience.

The computer system according to the third embodiment is different from the computer systems according to the first embodiment and second embodiment in that volume-creation-location block SDS nodes 400 are decided in the distributed file system creation process and the distributed file system expansion process.

Next, a distributed file system creation process 10000 is explained.

Figure 11:
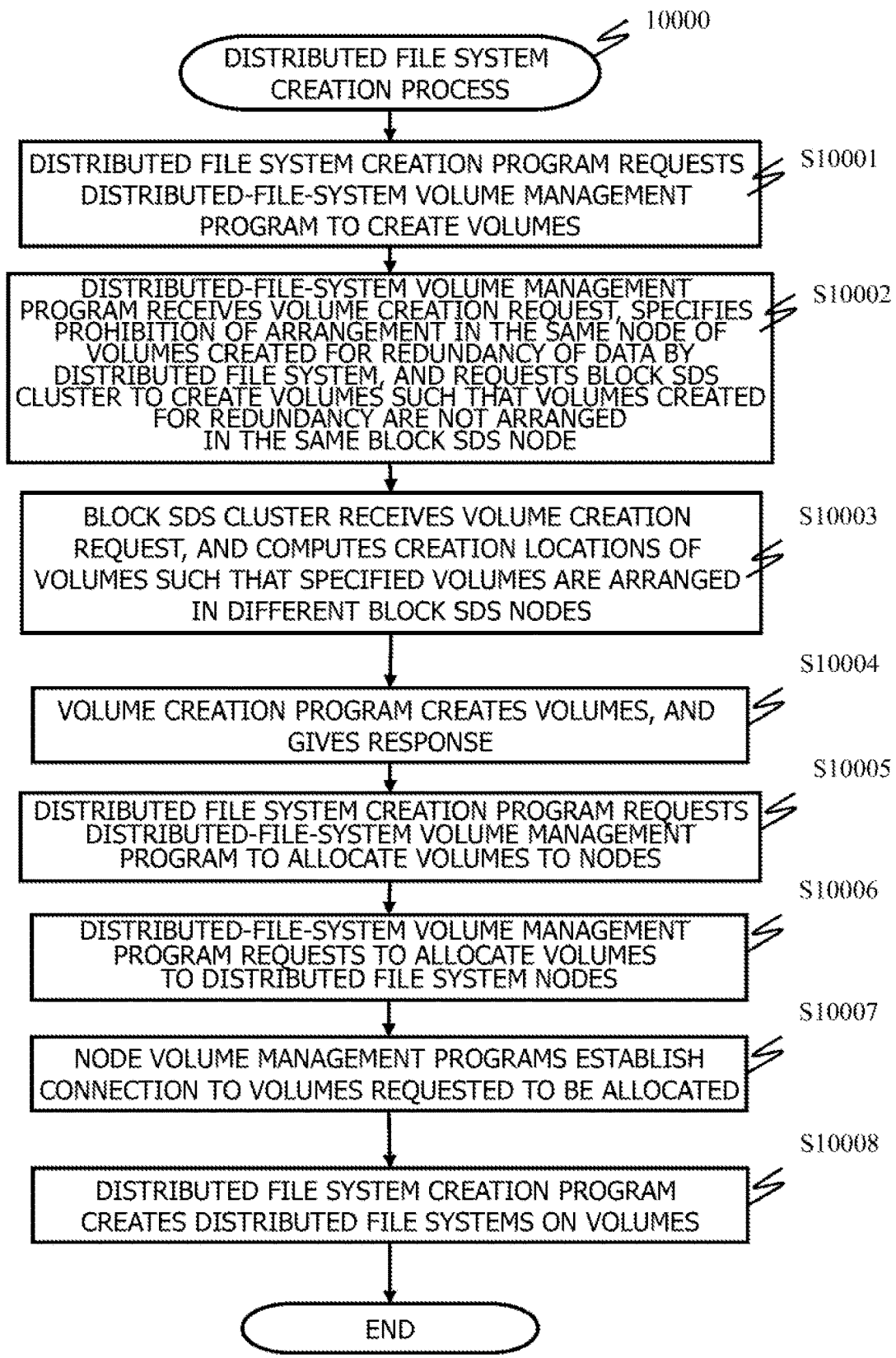
FIG. 11 is a flowchart of the distributed file system creation process according to a third embodiment.

FIG. 11 is a flowchart of the distributed file system creation process according to the third embodiment.

For example, the distributed file system creation process 10000 is executed in a case where the distributed file system creation program 312 receives a request for creating a distributed file system made by an administrator from the management server 20. The distributed file system creation process 10000 is a process performed by the CPU 302 executing the distributed file system creation program 312.

The distributed file system creation program 312 (strictly speaking, the CPU 302 executing the distributed file system creation program 312) receives the distributed file system creation request from the management server 20, and requests the distributed-file-system volume management program 314 to create a plurality of volumes to be used for the distributed file system (S10001).

The distributed-file-system volume management program 314 receives the volume creation request, refers to the redundancy configuration information 317, specifies a prohibition of arrangement in the same node of volumes created for redundancy of data by the distributed file system 60, and requests the block SDS cluster 40 to create the volumes such that the volumes created for redundancy are not arranged in the same block SDS node 400 (S10002). For example, the distributed-file-system volume management program 314 includes volume names of volumes to be created as a parameter of the volume creation request to the block SDS cluster, and includes volume names of a plurality of volumes having been created or to be created from now as the specification of the prohibition of arrangement in the same node of the volumes. Note that the specification of the prohibition of arrangement in the same node of the volumes is not limited to the specification of the volume names, and, for example, identifiers or fault sets of distributed file system nodes 300 may be specified.

The volume creation program 411 of the block SDS cluster 40 receives the volume creation request, and computes volume-creation-location block SDS nodes 400 such that the specified volumes are arranged in different block SDS nodes 400 (S10003).

The volume creation program 411 of the block SDS cluster 40 creates the specified volumes in the computed block SDS nodes 400, and gives a response to the distributed file system creation program 312 (S10004).

The distributed file system creation program 312 receives the response from the volume creation program 411, and requests the distributed-file-system volume management program 314 to allocate the created volumes to distributed file system nodes 300 (S10005).

The distributed-file-system volume management program 314 requests the node volume management programs 315 to allocate the volumes according to the request to the distributed file system nodes 300 (S10006).

The node volume management programs 315 receive the requests for allocating the volumes to the distributed file system nodes 300, and connect the distributed file system nodes 300 to the volumes specified by the allocation requests (S10007).

The distributed file system creation program 312 creates the distributed file systems 60 on the plurality of volumes connected to the distributed file system nodes 300 (S10008), and ends the distributed file system creation process 10000.

According to the distributed file system creation process 10000 described above, the distributed file systems 60 are created on the distributed file system cluster 30, file sharing services are provided to the clients 10 by the file sharing programs 310, and it becomes possible for the clients 10 to read and write files from and to the distributed file systems 60. In addition, the distributed file system creation process 10000 can arrange a plurality of volumes created for redundancy of data by the distributed file system 60 in different block SDS nodes 400. Thereby, it is possible to reduce the occurrence of situations where all volumes created for redundancy become unavailable at a time of a failure of a block SDS node 400.

Next, a distributed file system expansion process 11000 is explained.

Figure 12:
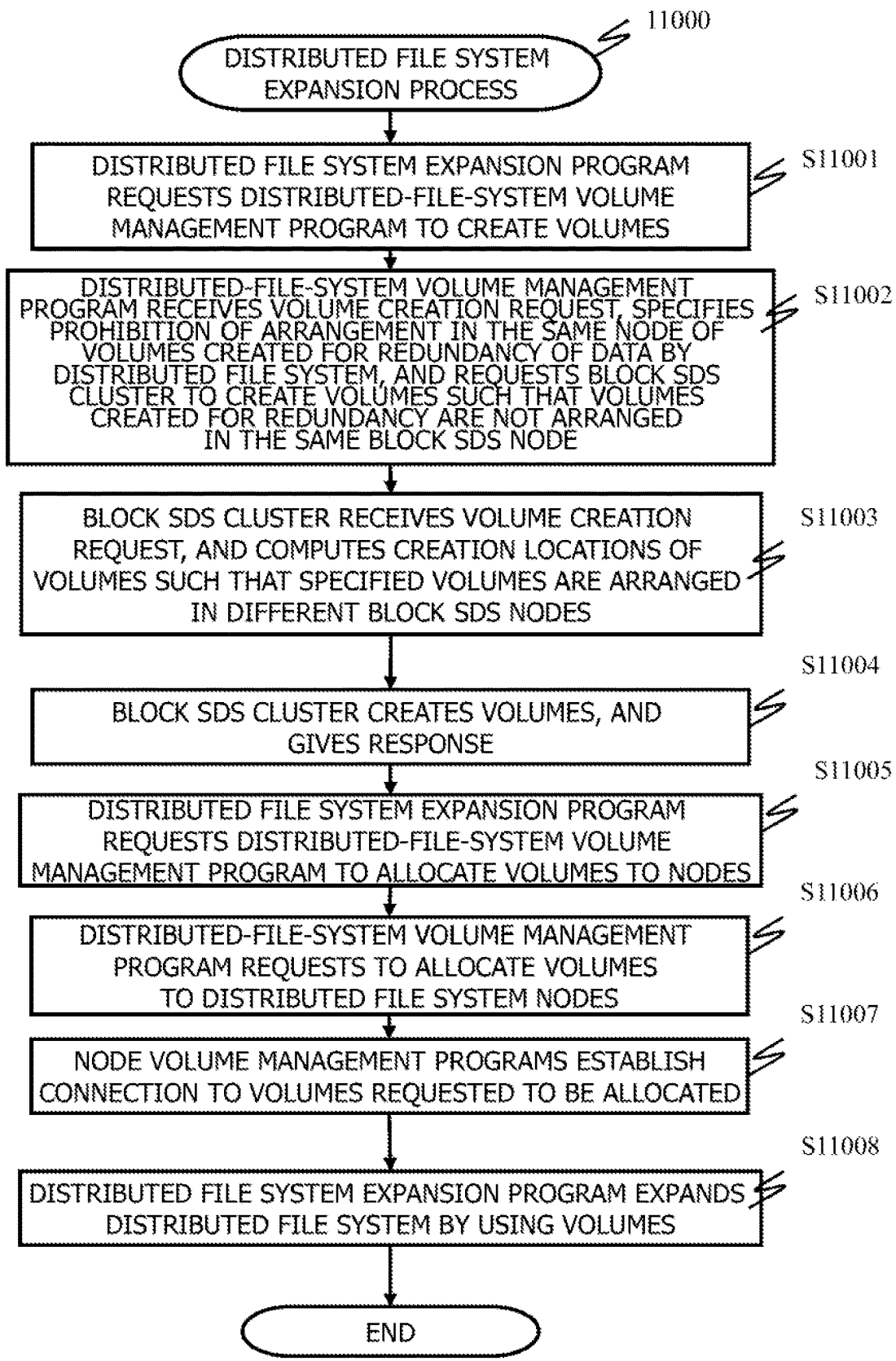
FIG. 12 is a flowchart of the distributed file system expansion process according to the third embodiment.

FIG. 12 is a flowchart of the distributed file system expansion process according to the third embodiment.

The distributed file system expansion process 11000 is a process executed in a case where the capacity of a distributed file system 60 becomes insufficient or in other cases, and, for example, is executed in a case where the distributed file system expansion program 313 receives a request for expanding the distributed file system made by an administrator from the management server 20. The distributed file system expansion process 11000 is a process performed by the CPU 302 executing the distributed file system expansion program 313.

The distributed file system expansion program 313 (strictly speaking, the CPU 302 executing the distributed file system expansion program 313) receives the distributed file system expansion request from the management server 20, and requests the distributed-file-system volume management program 314 to create a plurality of volumes to be used for the distributed file system (S11001).

The distributed-file-system volume management program 314 receives the volume creation request, refers to the redundancy configuration information 317, specifies a prohibition of arrangement in the same node of volumes created for redundancy of data by the distributed file system 60, and requests the block SDS cluster 40 to create the volumes such that the volumes created for redundancy are not arranged in the same block SDS node 400 (S11002). For example, the distributed-file-system volume management program 314 includes volume names of volumes to be created as a parameter of the volume creation request to the block SDS cluster, and includes volume names of a plurality of volumes having been created or to be created from now as the specification of the prohibition of arrangement in the same node of the volumes. Note that the specification of the prohibition of arrangement in the same node of the volumes is not limited to the specification of the volume names, and, for example, identifiers or fault sets of distributed file system nodes 300 may be specified.

The volume creation program 411 of the block SDS cluster 40 receives the volume creation request, and computes volume-creation-location block SDS nodes 400 such that the specified volumes are arranged in different block SDS nodes 400 (S11003).

The volume creation program 411 of the block SDS cluster 40 creates the specified volumes in the computed block SDS nodes 400, and gives a response to the distributed file system expansion program 313 (S1100).

The distributed file system expansion program 313 receives the response from the volume creation program 411, and requests the distributed-file-system volume management program 314 to allocate the created volumes to distributed file system nodes 300 (S11005).

The distributed-file-system volume management program 314 requests the node volume management programs 315 to allocate the volumes according to the request to the distributed file system nodes 300 (S11006).

The node volume management programs 315 receives the requests for allocating the volumes to the distributed file system nodes 300, and connect the distributed file system nodes 300 to the volumes specified the allocation requests (S11007).

The distributed file system expansion program 313 creates the distributed file systems 60 on the plurality of volumes connected to the distributed file system nodes 300 (S11008), and ends the distributed file system expansion process 11000.

The distributed file system expansion process 11000 described above can add volumes to the distributed file systems 60, and arrange a plurality of volumes created for redundancy of data including the added volumes in different block SDS nodes 400. Thereby, it is possible to reduce the occurrence of situations where all volumes created for redundancy become unavailable at a time of a failure of a block SDS node 400.

Note that the present invention is not limited to the embodiments mentioned above, and can be implemented by being modified as appropriate within the scope not deviating from the gist of the present invention.

For example, whereas it is checked whether or not all of plurality of volumes created for redundancy of data by the distributed file system 60 are arranged in different block SDS nodes 400, and all the volumes get to be arranged in different block SDS nodes 400 in the volume moving process 8000 in the embodiments described above, the present invention is not limited to this, and, for example, in a case where redundancy is attained by multiplication, volumes created for multiplication may get to be arranged not in only one block SDS node 400, that is, may get to be arranged in a plurality of block SDS nodes 400. In this case, for example, some volumes in a plurality of volumes in one block SDS node 400 may be moved to other block SDS nodes 400. By doing so, it is possible to reduce the occurrence of situations where all volumes become unavailable even in a case where a failure occurs in one block SDS node 400.

In addition, in a case where the information has not been updated at Steps S8002 and S8005 (S8002: No and S8005: No) in the volume moving process 8000 of the embodiments described above, this means that there are no changes regarding redundancy of the distributed file system 60, and therefore, the volume moving process 8000 may be ended without execution of the processes at Steps S8007 to S8010. By doing so, the processing load can be reduced.

In addition, whereas the management server 20 is configured as a physical computer separately from the distributed file system nodes 300 and the block SDS nodes 400 in the examples depicted in the embodiments described above, the present invention is not limited to this. For example, the management server 20 may be realized by a distributed the system node 300 or a block SDS node 400, and, in short, it is sufficient if any of configurations in a computer system functions as the management server.

In addition, some or all of processes performed by a CPU in the embodiments described above may be performed by a hardware circuit. In addition, programs in the embodiments described above may be installed from a program source. The program source may be a program distribution server or a storage medium (e.g. a portable storage medium).

What is claimed is:

1. A computer system comprising an upper cluster and a lower cluster, wherein
the upper cluster has a plurality of first nodes, and stores a management-subject data unit redundantly in a plurality of volumes managed by a plurality of first nodes,
the lower cluster has a plurality of second nodes, and provides a plurality of the volumes on a basis of storage regions of storage apparatuses of the second nodes,
a processor of the computer system performs control such that a plurality of the volumes storing the data unit in the upper cluster for redundancy are not volumes based on a storage region of a storage apparatus of one second node,
the processor of the computer system
identifies a second node having a storage region on which each of a plurality of the volumes storing the data unit for redundancy is based, and
in a case where one second node is identified for a plurality of the volumes, moves some volumes that are included in a plurality of the volumes and are based on a storage region of the one identified second node to a second node other than the one identified second node.

2. The computer system according to claim 1, wherein
the processor of the computer system performs control such that all of a plurality of the volumes storing the data unit for redundancy are volumes based on storage regions of storage apparatuses of different second nodes.

3. The computer system according to claim 2, wherein the redundancy is attained by multiplication of the data unit.

4. The computer system according to claim 2, wherein the redundancy is attained by erasure coding.

5. The computer system according to claim 1, further comprising a managing apparatus, wherein
a processor of the managing apparatus
identifies a second node having a storage region on which each of a plurality of the volumes storing the data unit for redundancy is based, and
in a case where one second node is identified for a plurality of volumes, instructs a processor of a second node in the lower cluster to move some volumes that are included in a plurality of the volumes and are based on a storage region of the one identified second node to a second node other than the one identified second node.

6. The computer system according to claim 1, further comprising a managing apparatus, wherein
a processor of the managing apparatus transmits, to the lower cluster, redundancy volume information that can identify a plurality of the volumes storing the data unit for redundancy, and
a processor of a second node in the lower cluster
receives the redundancy volume information,
identifies a second node having a storage region on which each of a plurality of the volumes corresponding to the redundancy volume information is based, and
in a case where one second node is identified for a plurality of volumes, moves some volumes that are in a plurality of the volumes and are based on a storage region of the one identified second node to a second node other than the one identified second node.

7. The computer system according to claim 2, wherein the processor of the computer system
receives redundancy volume plurality of the volumes storing the data unit for redundancy, and
generates a plurality of volumes corresponding to the redundancy volume information such that the generated plurality of volumes are volumes based on storage regions of storage apparatuses of different second nodes.

8. A volume arrangement managing apparatus that manages movement of volumes in a computer system including an upper cluster and a lower cluster, wherein
the upper cluster has a plurality of first nodes, and stores a management-subject data unit redundantly in a plurality of volumes managed by a plurality of first nodes,
the lower cluster has a plurality of second nodes, and provides a plurality of the volumes on a basis of storage regions of storage apparatuses of the second nodes,
a processor of the managing apparatus performs control such that a plurality of the volumes storing the data unit in the upper cluster for redundancy are not volumes based on a storage region of a storage apparatus of one second node,
the processor of managing apparatus
identifies a second node having a storage region on which each of a plurality of the volumes storing the data unit for redundancy is based, and
in a case where one second node is identified for a plurality of the volumes, moves some volumes that are included in a plurality of the volumes and are based on a storage region of the one identified second node to a second node other than the one identified second node.

9. A volume arrangement management method performed by a computer system including an upper cluster and a lower cluster, the method comprising:
storing, by the upper cluster having a plurality of first nodes, a management-subject data unit redundantly in a plurality of volumes managed by a plurality of first nodes;
providing, by the lower cluster having a plurality of second nodes, a plurality of the volumes on a basis of storage regions of storage apparatuses of the second nodes;
performing control, by the computer system, such that a plurality of the volumes storing the data unit in the upper cluster for redundancy are not volumes based on a storage region of a storage apparatus of one second node;
identifying by the computer system a second node having a storage region on which each of a plurality of the volumes storing the data unit for redundancy is based, and
in a case where one second node is identified for a plurality of the volumes, moving by the computer system some volumes that are included in a plurality of the volumes and are based on a storage region of the one identified second node to a second node other than the one identified second node.

* * * * *